Patented June 23, 1953

2,643,239

UNITED STATES PATENT OFFICE 2,643,239

NITROGEN-CONTAINING POLYETHERS AND PROCESS FOR CURING GLYCIDYL POLYETHERS TO RESINOUS PRODUCTS

Edward C. Shokal, Walnut Creek, Herbert A. Newey, Lafayette, and Theodore F. Bradley, Orinda, Calif., assignors to Shell Development Company, Emeryville, Calif., a corporation of Delaware No Drawing. Application March 28, 1951, Serial No. 218,094

6 Claims. (Cl. 260—42)

This invention relates to nitrogen-containing polyethers and to a process for curing glycidyl polyethers to resinous products.

Glycidyl polyethers having a 1,2-epoxy equivalency greater than 1.0, which are obtained, for example, by reacting epichlorhydrin with a polyhydric phenol in an alkaline medium, have heretofore been cured to hard resinous products by heating with about 0.1 to 5% of various amines. While the amine hardening agents effect excellent cures of the glycidyl polyethers, the feasibility of their use on a commercial basis is far from satisfactory. The amines as a class have obnoxious odors which are offensive to workers. Since the curing operations are ordinarily conducted with the compositions containing the amine hardening agents open to the atmosphere of the room into which some vapors of the amines permeate, the resulting foul odors are very disagreeable. Furthermore, the curing reactions which occur in using amine hardening agents with the glycidyl polyethers are quite exothermic in character. Optimum cure of the polyethers is ordinarily obtained by maintaining the resin-forming composition at a chosen temperature. With some amine hardening agents, such as the secondary amines which are very active catalysts, it is very difficult, and at times impossible, to keep the composition undergoing cure at the chosen temperature because the exothermic reactions tend to force the temperature upwards. This is especially true upon curing relatively large quantities of the resin-forming compositions because the rate of heat formation from the exothermic reactions of curing exceeds the extent of heat loss from the curing composition.

These prior difficulties are overcome with the present invention by using as curing agent novel preformed reaction products from reaction of a glycidyl polyether of a dihydric phenol having a 1,2-epoxy equivalency between 1.0 and 2.0 with a secondary amine containing a single nitrogen atom which is linked to two different carbon atoms while having in the reaction mixture at least 1.5 moles of the amine per epoxide equivalent weight of the polyether. Unlike the product obtained by curing the glycidyl polyether with small proportions of an amine whereby the obtained product is insoluble and is incompatible with additional quantities of glycidyl polyethers, the preformed reaction product made with use of the molar excess of amine is soluble in a variety of organic solvents and is homogeneously compatible with further quantities of the resin-forming glycidyl polyethers. The new product is devoid of the foul and obnoxious odor characterizing the free amines and thus use of expensive fume removal machinery in application as a curing agent is obviated. Moreover, this preformed product has equal ability as a curing agent for the glycidyl polyethers and also has the advantage of not causing the exothermic phenomena during the cure which makes temperature control so difficult when free amines are employed. The curing of the resin-forming compositions comprising a glycidyl polyether with the preformed product admixed therewith as curing agent proceeds smoothly and rapidly.

There is an additional advantage of one aspect of the invention that is to be noted. Dimethylamine gives excellent cures of glycidyl polyethers to resinous products. However, since this amine is a gas at ordinary temperature and pressure, its use as a curing agent for most applications is precluded because use of pressure equipment for applications such as protective surface coating work is not practicable. By following the methods of the present invention with formation of the preformed reaction product of dimethylamine and then using this product as the curing agent for additional quantities of glycidyl polyether in surface coating compositions, all the inherent advantages of the amine are realized without use of the impractical pressure machinery heretofore necessary for curing the surface coating.

The glycidyl polyether of a dihydric phenol employed in forming the new reaction products of the invention is obtainable by reacting epichlorhydrin with a dihydric phenol in alkaline medium. The polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

wherein $n$ is an integer of the series 0, 1, 2, 3 ... and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol. It contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The glycidyl polyethers of a dihydric phenol used in the invention have a 1,2-epoxy equivalency greater than 1.0. By the epoxy equivalency reference is made to the average number of 1,2-epoxy groups

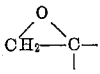

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily an integer 2. However, in all cases it is a value greater than 1.0. The 1,2-epoxy equivalency of the polyethers is thus a value between 1.0 and 2.0.

The 1,2-epoxide value of the glycidyl polyether is determined by heating a weighed sample of the ether with an excess of 0.2N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1N sodium hydroxide in methanol to the phenol-phthalein end point. This method is used for obtaining all epoxide values discussed herein.

As is explained hereinafter more fully, the novel products from reaction of a secondary amine with a glycidyl polyether are obtained with use of at least 1.5 moles of the amine per epoxide equivalent weight of the glycidyl polyether. By the term epoxide equivalent weight reference is made to the weight of glycidyl polyether which contains and is equivalent to one 1,2-epoxy group. For example, the glycidyl polyether of 2,2-bis(4-hydroxyphenyl)propane designated herein as polyether A, has a measured epoxy value of 0.50 epoxy equivalent per 100 grams and a measured molecular weight of 370. The 1,2-epoxy equivalency of polyether A is, therefore, 1.85 and the epoxide equivalent weight is 200. In preparing the soluble and fusible reaction product of the invention, there is used at least 1.5 moles of secondary amine per 200 parts by weight of polyether A.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenol)propane which is termed bis-phenol herein for convenience, 4,4'-dihydroxybenzophenone, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiary-butylphenyl)propane, 2,2-bis(2-hydroxynaphthyl)pentane, 1,5-dihydroxynaphthalene, etc.

Preferred polyethers are prepared from 2,2-bis(4-hydroxyphenyl)propane. They contain a chain of alternating glyceryl and 2,2-bis(4-phenylene)propane radicals separated by intervening ethereal oxygen atoms and have a 1,2-epoxy equivalency between 1.0 and 2.0, a molecular weight of about 340 to 624, and an epoxide equivalent weight of about 175 to 400. More generally, it is preferred to employ glycidyl polyether of a dihydric phenol which has a value for $n$ in the above-mentioned structural formula of about 0 to 2.

The glycidyl polyethers will be more fully understood from consideration of the following described preparations and the properties of the products.

Polyether A

Glycidyl polyethers of a dihydric phenol having lowest molecular weight, i. e., $n$ approaching or equaling zero, are best prepared by reacting the dihydric phenol and base with epichlorhydrin in the presence of a large excess of epichlorhydrin such as at least 5 mols of epichlorhydrin per mol of the phenol.

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 1.85. The product is designated herein as polyether A.

Polyether B

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having a softening point of 27° C. by Durrans' mercury method, an epoxide equivalent weight of 245 and a molecular weight of 460. The 1,2-epoxy equivalency is 1.88. This product will be referred to hereinafter as polyether B.

Polyether C

Polyethers of higher molecular weight are prepared by using smaller ratios of epichlorhydrin to bis-phenol. In a vessel fitted with an agitator, 228 parts (1 mol) of bis-phenol and 75 parts (1.88 mols) sodium hydroxide as a 10% aqueous solution are introduced and heated to about 45° C. whereupon 145 parts (1.57 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 69° C. The measured molecular weight of the product is 900 and it has an epoxide value of 0.20 epoxy equivalent per 100 grams. The epoxide equivalent weight is 500, and the 1,2-epoxy equivalency is 1.8. It will be identified hereinafter as polyether C.

Polyether D

This glycidyl polyether is prepared in like manner to that of polyether C except that for each mol of bis-phenol there is employed 1.22 mols of epichlorhydrin and 1.37 mols of sodium hydroxide. The resulting polyether has a softening point of 98° C. by Durrans' mercury method, a molecular weight of 1400 as measured ebullioscopically in ethylene dichloride, and an epoxide value of 0.103 epoxy equivalent per 100 grams. The epoxide equivalent weight is 970, and the 1,2-epoxy equivalency is 1.44.

Polyether E

Glycidyl polyethers of still higher molecular weight are most easily prepared by heating together and reacting a lower polyether with additional dihydric phenol. 100 parts of polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxide value of 0.05 epoxy equivalent per 100 grams, an epoxide equivalent weight of 2000, and a 1,2-epoxy equivalency of 1.45.

Any of the various secondary amines are used in preparing the curing agents of the invention provided they contain only a single nitrogen atom which is linked directly to two different carbon atoms. Since the amine is a secondary amine, it necessarily also has a single hydrogen atom linked directly to the nitrogen atom. Among representative compounds are dimethylamine, diethylamine, dipropylamine, dibutylamine, diisobutylamine, di-(sec-butyl)amine, di-(tert-butyl)amine, dioctylamine, dinonylamine, distearylamine, diallylamine, dioleylamine, dicyclohexylamine and dibenzylamine. Besides such symmetrical secondary amines, the amine can be asymmetrical as is the case with typical compounds like methylethylamine, methylisoamylamine, ethylpropylamine, methylallylamine, methylpropargylamine, ethylcyclohexylamine, methylbenzylamine, and o-tolylnaphthylamine. The secondary amine can also have the nitrogen atom as a member of a ring as in such representative compounds as trimethyleneimine, pyrrole, pyrrolidine, 2-methylpyrrolidine, piperidine, tetrahydropyridine, 2-methylpiperidine, 4-methylpiperidine, 2,6-dimethylpiperidine, and decahydroquinoline. The amine preferably contains only the elements carbon and hydrogen besides the single secondary amino nitrogen atom which is preferably linked directly to two different aliphatic carbon atoms. It is also preferred to employ an amine of 2 to 10 carbon atoms. While ordinarily the reaction product is prepared from a single amine, mixtures of two or more different amines may be used if desired.

The soluble and permanently fusible reaction product of the invention is prepared by bringing together and mixing the glycidyl polyether with the amine whereupon chemical reaction between the two reactants begins. The primary reaction is the chemical coupling of the amine to the epoxy group in the glycidyl radicals contained in the polyether so that 3-amino-2-hydroxypropyl and/or 2-amino-3-hydroxypropyl groups are formed wherein the amino group is a tertiary amino group. There also occurs a very minor amount of reaction of the glycidyl groups with alcoholic hydroxyl groups contained in the glycidyl polyether. Although the coupling reaction between the glycidyl polyether and the amine occurs upon bringing the two reactants together at room temperature (15–25° C.), it is in general preferred to heat the reaction mixture and at least complete the reaction at an elevated temperature. For this purpose, a temperature of about 50 to 150° C. is suitable. The reaction is usually effected under atmospheric pressure although superatmospheric pressure may be used especially with low boiling amines like dimethylamine.

In order that the desired novel product will be obtained instead of a cured resinous mass, it is necessary that an important detail be observed, namely, that a proper proportion of reactants be used. The soluble and permanently fusible product is obtained when the glycidyl polyether of a polyhydric phenol is reacted with the secondary amine while having present at least 1.5 mols of the amine per epoxide equivalent weight of the polyether. More preferably there is used from 2 to 5 mols of amine per epoxide equivalent weight. Aside from matters of economy, there is no particular upper limit to the ratio. Only about one mol of amine actually reacts and chemically combines with one epoxide equivalent weight of the polyether. The unreacted excess amine is separated and removed from the reaction product as completely as possible by usual methods such as distillation or extraction. Where appropriate, steam distillation, vacuum pumping and purging with inert gas are used.

In view of the critical character of the proportion of reactants, it is preferred to add the glycidyl polyether to the mass of the amine. This prevents local regions of improper proportions of ingredients.

With glycidyl polyethers which are very viscous or solid at ordinary temperature, the use of heat so as to have the polyether in a mobile molten condition during mixing is desirable. The same is true with normally solid amines. It is also at times advantageous to effect the reaction in an inert organic solvent for the reactants and product. Dioxane is particularly useful for this purpose since it possesses the desired solvency and the formed product may be readily separated therefrom as a precipitate upon addition of water to the solution. Another useful solvent is diethyl ether.

The novel products of the invention prepared with use of the excess of secondary amine are viscous liquid to solid materials. They are characterized by being soluble in a variety of organic solvents such as dioxane, diethyl ether, methanol, acetone, chloroform and toluene. The products are also permanently fusible in that they do not harden and resinify upon being heated at say 50° C. to 100° C. for extended periods of time such as 24 hours. In contrast, the resins of the prior art obtained by curing glycidyl polyethers of dihydric phenols with a small amount of a secondary amine are insoluble in organic solvents and are infusible.

Reaction products of the invention and their preparation are illustrated by the following examples, but the scope of the invention is not to be construed as limited to details described therein. The parts are by weight.

EXAMPLE 1

To 570 parts of diethylamine contained in a flask equipped with a stirrer, condenser and thermometer was added a solution of 500 parts of polyether A in 500 parts of dioxane. A slight exothermic reaction ensued and the stirred reaction mixture was immediately heated to reflux temperature of 55–60° C. where it was held for 3 hours. The reaction mixture was then poured into 3000 parts of water and the sticky reaction product repeatedly washed with water to remove as much unreacted amine and dioxane as possible. The product was next dissolved in some diethyl ether and the solution was washed with water until the effluent was substantially neutral to alkacid paper. The ethereal solution was then dried with Drierite and the ether removed by distillation in vacuo. The product in amount of 378 parts was a very viscous liquid which became quite fluid upon heating to 60° C. Analysis of the product gave the following results:

| | |
|---|---|
| Nitrogen _____percent__ | 5.2 |
| Carbon _____do____ | 71.7 |
| Hydrogen _____do____ | 9.4 |
| Molecular weight _____ | 526 |
| Durrans' mercury method softening point ° C__ | 13.6 |

EXAMPLE 2

In order to show the striking difference in character and properties of products obtained upon reacting different proportions of diethylamine with polyester A, a quantity of glycidyl polyether was reacted in the presence of such a proportion of the diamine that there was present about 0.14 mole of diethylamine per epoxide equivalent weight of the polyether. To 100 parts of polyether A were mixed 5 parts of diethylamine and the mixture was kept at 25° C. for 60 hours followed by heating for 24 hours at 65° C. The product was a solid resin having a Barcol hardness of 32. The resin was infusible, and was insoluble in diethyl ether, methanol, acetone, chloroform and toluene.

In contrast the product prepared as described in Example 1 using an excess of diethylamine, besides being liquid, was readily soluble in the above-mentioned organic solvents. The Example 1 product was prepared with use of about 3.1 mols of diethylamine per epoxide equivalent weight of polyether A.

EXAMPLE 3

A mixture of 100 parts of polyether A, 300 parts of dimethylamine and 200 parts of dioxane was divided and placed in two sealed glass pressure tubes. The tubes containing the reaction mixture were heated at 65° C. for 6 hours. The tubes were opened and the combined contents subjected to pumping at 25° C. under 2 mm. pressure in order to remove the dioxane and excess dimethylamine. The obtained product was a very viscous liquid.

EXAMPLE 4

A solution of 220 parts of polyether A in 530 parts of dioxane was charged to a closed kettle fitted with a condenser employing acetone which circulated through Dry Ice as cooling medium. About 400 parts of dimethylamine were introduced and the reaction mixture was warmed for about 24 hours, while refluxing at a kettle temperature of 22 to 23° C. Reflux was then discontinued and the reaction mixture was allowed to stand at room temperature for an additional 44 hours. A 10 part sample was removed. The bulk of the product was then heated slowly in a distillation flask to 165° C. while decreasing the pressure to 0.5 mm. during a 30 minute period in order to remove any residual dimethylamine. The product in amount of 255 parts was a viscous liquid which was quite fluid at 60° C. Analysis of the product gave the following results:

| | |
|---|---|
| Per cent nitrogen_____ | 6.1 |
| Molecular weight _____ | 487 |

EXAMPLE 5

To 438 parts of diethylamine heated to 60° C. and contained in a flask fitted with a stirrer, condenser and thermometer was added a solution of 500 parts polyether B in 500 parts of dioxane. An exothermic reaction ensued with the temperature rising to about 70° C. The reaction mixture was heated and held at reflux temperature of 55 to 60° C. for 3 hours. The solution was filtered and the excess diethylamine and dioxane removed under a vacuum of 2 to 3 mm. pressure at 50 to 73° C. The product in amount of 454 parts was a very viscous liquid which became quite fluid at 60° C. The product was analyzed as follows:

| | | |
|---|---|---|
| Nitrogen | percent | 4.2 |
| Carbon | do | 72.5 |
| Hydrogen | do | 8.9 |
| Molecular weight | | 620 |

EXAMPLE 6

Piperidine in amount of 400 parts was placed in a flask fitted with a condenser and warmed gently with stirring to about 40° C. There were then slowly added 125 parts of polyether A while holding the temperature to about 60° C. The reaction mixture was then subjected to distillation up to a temperature of 80° C. in a Claisen flask to remove excess piperidine. Water was added and residual piperidine steam distilled out with agitation. The product was washed with water at about 100° C. until free of piperidine odor and then dried in vacuo at 150° C. under 10 mm. pressure for 2 hours. The product was of almost solid consistency, but became quite fluid on heating to 60° C. Analysis gave the following results:

| | | |
|---|---|---|
| Nitrogen | percent | 5.1 |
| Molecular weight | | 540 |

EXAMPLE 7

A mixture was prepared of 3 parts of piperidine in 100 parts of polyether A. This proportion amounts to about 0.071 mole of piperidine per epoxide equivalent weight of the polyether. A second mixture was prepared containing 5 parts of piperidine in 100 parts of polyether A, which proportion is about 0.12 mole of piperidine per epoxide equivalent weight of the polyether. Both mixtures were heated at 65° C. for 24 hours. The product in each case was a solid resin which was infusible. The resin was insoluble in acetone and in methanol.

In contrast the piperidine product obtained as described in Example 6 was readily soluble in acetone and methanol because it was prepared using about 7.5 moles of piperidine per epoxide equivalent weight of the polyether.

The preformed reaction products are very useful as curing agents for glycidyl polyether of polyhydric phenols and/or glycidyl polyether of polyhydric alcohols which have a 1,2-epoxy equivalency greater than 1.0. The reaction products cure such glycidyl polyethers to resinous materials which are useful in a variety of applications. Besides being free of obnoxious odor of the amines, the preformed reaction products enable excellent tight cures of the glycidyl polyethers without development of strongly exothermic reactions which make temperature control so difficult when the free amines are employed as curing agents. The preformed reaction products convert the glycidyl polyethers to hard, tough, infusible, and chemically resistant resins either at room temperature or at temperatures generally used in preparing baked surface coatings. This use of the resinous products as protective films is an important aspect of the invention since the cured resins are very resistant against chemical action upon being contacted with various corrosive substances.

Another important application of the invention is use of the compositions of glycidyl polyethers having admixed therewith the preformed reaction products as curing agents for potting purposes where miniature electrical circuits are imbedded in the cured resin and the resin not only holds the components of the electrical circuit in place, but also insulates one part from another. The compositions are ideally suited for this purpose. They cure at low temperature without pressure, and shrink very little during the curing operation. The cured resins adhere well to all parts, metal or otherwise; they possess good electrical properties; and they are tough enough to withstand extreme changes of temperature (thermal shock) without shattering or cracking.

The compositions are also useful as adhesives since they cure at room temperature without pressure and enable excellent bonding of various combinations of materials, including high strength bonds between metal and metal.

The preformed reaction products effect the cure of any of the glycidyl polyethers of polyhydric phenols such as have been described herein. Such glycidyl polyethers may be used alone or in admixture with other substance. A particularly useful additive is a glycidyl polyether of a polyhydric alcohol having a 1,2-epoxy equivalency greater than 1.0. Very useful are mixtures containing about 10 to 50% of glycidyl polyether of a polyhydric alcohol with glycidyl polyether of a polyhydric phenol. If desired, the preformed reaction product is employed to cure glycidyl polyether of polyhydric alcohol alone.

Representative glycidyl polyethers of polyhydric alcohols include the diglycidyl ethers of ethylene glycol, propylene glycol, trimethylene glycol, diethylene glycol, triethylene glycol, glycerol, dipropylene glycol, and the like. Other typical ethers contain more than two glycidyl groups and include glycidyl polyethers of glycerol, diglycerol, erythritol, pentaglycerol, mannitol, sorbitol, polyallyl alcohol, polyvinyl alcohol, and the like. The glycidyl polyethers of the polyhydric alcohols are prepared by reacting the polyhydric alcohol with epichlorhydrin in the presence of about 0.1 to 2% of an acid-acting catalyst such as boron trifluoride, hydrofluoric acid or stannic chloride, whereby the chlorhydrin ether is formed as product. The reaction is effected at about 50 to 125° C. with the proportions of reactants preferably being such that there is about 1 mol of epichlorhydrin for each molecular equivalent of hydroxyl group in the polyhydric alcohol. Thus, in preparing the ether of glycerol, which polyhydric alcohol contains three hydroxyl groups in each mol thereof, about three mols of epichlorhydrin for each mol of glycerol are used. The resulting chlorhydrin polyether from the reaction of a polyhydric alcohol with epichlorhydrin is then dehydrochlorinated by heating at about 50 to 125° C. with a small, say 10% stoichiometrical excess of a base. For this purpose, sodium aluminate gives good results.

Preparation of glycidyl polyethers of polyhydric alcohols may be illustrated by considering preparation of glycidyl polyether of glycerol.

Polyether F

About 276 parts of glycerol (3 mols) were mixed with 828 parts of epichlorhydrin (9 mols). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in a dioxane solution. These values showed that the polyglycidyl ether had a 1,2-epoxy equivalency of 2.18, i. e., an average of about 2.2 epoxide groups per molecule. For convenience, this product will be known as polyether F.

In using the preformed reaction products as curing agents for glycidyl polyethers having a 1,2-epoxy equivalency greater than 1.0, the desired curing may be effected by merely mixing the two substances and allowing the resinifying reaction to occur at ordinary atmospheric temperature of about 15 to 40° C. In general, however, it is preferred to shorten the time of cure by use of a more elevated temperature such as from about 50 to 250° C. Temperatures of about 60 to 150° C. are particularly suitable.

Various proportions of the preformed reaction product can be admixed with glycidyl polyethers in order to effect cure thereof. In general, however, it is preferred to use such a proportion of reaction product in admixture with the glycidyl polyether or polyethers that the composition contains about 0.2 to 4% nitrogen. A more preferred range of nitrogen content in the composition is from about 0.3 to 2%.

In curing the glycidyl polyethers with the preformed reaction products, the compositions may contain other desired ingredients such as solvents, pigments, plasticizers, other resins, and the like. It is useful to add liquid diluents in fluidizing proportions of say 5 to 25% to the very viscous to solid compositions containing a preformed reaction product in admixture with the higher glycidyl polyethers. Suitable diluents for this purpose include liquid mono-epoxy compounds such as glycidyl allyl ether, glycidyl phenyl ether, glycidyl ethyl ether, styrene oxide, 1,2-hexylene oxide, and the like, as well as liquid cyano-substituted hydrocarbons such as acetonitrile, propionitrile, adiponitrile, benzonitrile, and the like.

The process of the invention is illustrated in the following examples which are not to be construed as limitative thereof. The parts are by weight.

EXAMPLE 8

The preformed reaction product obtained as described in Example 4 (the dimethylamine-polyether A product) was tested as a curing agent for a glycidyl polyether of a dihydric phenol. Batches of polyether A in amount of 100 parts each were mixed at 65° C. with the amounts of reaction product noted below and the mixtures were heated in an oven maintained at 55 to 60° C. to effect the cure with the following results:

| Parts Added | Result |
| --- | --- |
| 2.5 | Not set in 19 hours. |
| 5 | Cured solid in 19 hours. |
| 10 | Set fully hard in 1 hour. |
| 15 | Do. |

EXAMPLE 9

The Example 3 reaction product was tested as to concentration, time and temperature when used as curing agent for polyether A, and the following results were obtained:

| Parts Reaction Product per 100 Parts Polyether A | Cure Condition | | Barcol Hardness of Resin |
| --- | --- | --- | --- |
| | Time, Min. | Temp., °C. | |
| 10 | 15 | 100 | 0 |
| 10 | 30 | 100 | 17 |
| 10 | 45 | 100 | 20 |
| 10 | 15 | 125 | 0 |
| 10 | 30 | 125 | 12 |
| 15 | 15 | 100 | 13 |
| 15 | 30 | 100 | 13 |
| 15 | 15 | 125 | 16 |
| 15 | 30 | 125 | 14 |
| 15 | 15 | 150 | 13 |
| 20 | 15 | 100 | 16 |
| 20 | 30 | 100 | 17 |
| 20 | 15 | 125 | 17 |
| 20 | 15 | 150 | 14 |

EXAMPLE 10

Glass cloth laminates were prepared using polyether A cured with the Example 3 reaction product. The laminates were prepared by spreading the mixture of polyether and curing agent on sheets of glass cloth, stacking four coated sheets together and curing between platens of a press under a pressure of 15 pounds per square inch. Various proportions of the reaction product were used as curing agent at different times and temperatures. The results with the Barcol hardness of the laminates are tabulated below.

| Parts Reaction Product per 100 Parts Polyether A | Cure Condition | | Barcol Hardness of Resin |
| --- | --- | --- | --- |
| | Time, Min. | Temp., °C. | |
| 0.6 | 60 | 100 | 0 |
| 1.1 | 60 | 100 | 50 |
| 11 | 60 | 100 | 54 |
| 22 | 60 | 100 | 55 |
| 44 | 60 | 100 | 50 |
| 87 | 60 | 100 | 40 |
| 11 | 10 | 80 | 0 |
| 11 | 20 | 80 | 0 |
| 11 | 35 | 80 | 20 |
| 11 | 55 | 80 | 35 |
| 11 | 90 | 80 | 45 |
| 11 | 120 | 80 | 58 |
| 11 | 15 | 115 | 48 |
| 11 | 30 | 115 | 60 |
| 11 | 45 | 115 | 60 |

EXAMPLE 11

Various proportions of the reaction product prepared as described in Example 1 (the diethylamine-polyether A product) were added to polyether A and subjected to different times of cure at 65° C. as noted below in the table which gives the results:

| Parts Reaction Product per 100 Parts Polyether A | Time of Cure in Hours | Condition of Product or Barcol Hardness |
| --- | --- | --- |
| 2 | 24 | Viscous liquid. |
| 5 | 24 | Slightly rubbery. |
| 10 | 24 | 29. |
| 2 | 120 | Fluid and uncured. |
| 5 | 120 | 25. |
| 10 | 120 | 32. |

EXAMPLE 12

Two sheets of resin of about one-quarter inch thickness were prepared from mixtures of polyether A and the reaction product obtained as described in Example 1 (the diethylamine-polyether A product). One contained an added 5% of the curing agent and the other an added 10%. Each mixture was poured into a plate mold coated with a cellulose acetate film. The two mixtures were cured by heating at 65° C. for 48 hours. The resulting cured sheets of resin were subjected to various physical tests, including strength tests according to standard A. S. T. M. methods which are designated in the table below by the appropriate code numbers.

| Percent Curing Agent | 5 | 10 |
|---|---|---|
| Barcol Hardness | 29 | 34 |
| Heat Distortion (D648–45T) | 42 | 62 |
| Izod Impact Strength (D256–47T) | 0.34 | 0.40 |
| Flexural Strength (D790–45T) | 18,800 | 17,700 |

EXAMPLE 13

To a mixture of 75 parts of polyether B and 25 parts of polyether F were added 5 parts of the reaction product prepared as described in Example 1 (the diethylamine-polyether A product) with stirring and heating at 50 to 60° C. until homogeneous. The mixture was then cured at 65 to 70° C. for 24 hours whereupon hardening to a clear amber solid resin occurred. The resin had a Barcol hardness of 11.

The experiment was repeated except that 10 parts of the Example 1 reaction product was used. Again there was resinification to a clear amber solid resin having a Barcol hardness of 30.

EXAMPLE 14

Tests were conducted to determine the suitability for adhesive purposes of glycidyl polyether compositions cured with the preformed reaction products of the invention. For this purpose, 75 parts of polyether A were mixed with 25 parts of polyether F and there were added thereto as curing agent the amounts stated in the table below of the preformed reaction product prepared as described in Example 5 (the diethylamine-polyether B product). Blocks of about one-quarter inch thickness made of linen cloth laminated together with phenolic resin were employed for the test. The adhesive compositions were spread on a one inch square surface of each of two blocks with the aid of a doctor blade having a clearance of 0.005 inch. The coated surfaces of the blocks were united and the joined blocks were placed in a constant temperature room set at 25° C. in order to cure the adhesive composition. After 6 days' time, the blocks were subjected to the block shear test of the Army-Navy-Civil Committee on Aircraft Design Criteria: "Wood Aircraft Inspection and Fabrication." ANC 19 (Dec. 20, 1943) discussed in an article by R. C. Rinker and G. M. Kline, Modern Plastics, vol. 23, p. 164, 1945. The results follow:

| Parts Reaction Product per 100 Parts Polyether Mixture | Gardner-Holdt Viscosity Before Cure | Shear Strength in lbs. per sq. in. |
|---|---|---|
| 15 | Z2–Z3 | 3,490 |
| 25 | Z3–Z4 | 2,215 |
| 50 | Z5–Z6 | 360 |

EXAMPLE 15

Castings were prepared by adding various amounts of the Example 5 product (the diethylamine-polyether B product) to quantities of polyether A as listed in the following table, and curing the mixtures by heating at 65° C. for 30 hours. The Barcol hardness of the castings was determined initially after the cure, and after immersing in boiling water for 15 minutes.

| Parts Reaction Product Per 100 Parts Polyether A | Barcol Hardness | |
|---|---|---|
| | Initial | After Immersion in Boiling $H_2O$ |
| 15 | 38 | 29 |
| 25 | 36 | 27 |
| 50 | 32 | 20 |

EXAMPLE 16

Films on sheet metal panels were prepared from various compositions containing the amounts of the different constituents as indicated in the table below. Stock solutions were prepared containing 40% of polyether C, D or E in a mixture consisting of equal parts by weight of xylene and the monoacetate of ethylene glycol monomethyl ether. The indicated amount of curing agent was added, a sheet metal panel coated with the solution, allowed to dry for about one-half hour and subjected to the stated baking temperature for 30 minutes.

| 100 Parts Polyether | Curing Agent Described in Example | Parts Curing Agent Per 100 Parts Polyether | Baking Temperature, °C. |
|---|---|---|---|
| E | 5 | 2.5 | 200 |
| E | 5 | 5 | 200 |
| E | 5 | 12.5 | 200 |
| E | 5 | 25 | 200 |
| C | 5 | 30 | 200 |
| D | 1 | 2.5 | 150 |
| D | 1 | 5 | 150 |
| E | 5 | 12.5 | 100 |
| E | 5 | 25 | 100 |

EXAMPLE 17

To warmed separate 100 part portions of polyether A were added 10, 20 and 40 parts of the reaction product obtained as described in Example 6 (the piperidine-polyether A product). The mixed compositions were then cured at 65° C. for 17 hours. In each case a hard resin with light amber color was obtained, e. g., the resin obtained from the composition containing 20 parts of curing agent had a Barcol hardness of 29.

We claim as our invention:

1. A process for curing a glycidyl polyether having a 1,2-epoxy equivalency greater than 1.0 to a resinous material which comprises resinifying said polyether in admixture with the preformed reaction product from reaction of a glycidyl polyether of a dihydric phenol having a 1,2-epoxy equivalency between 1.0 and 2.0 with a secondary amine containing a single nitrogen atom which is linked directly to two different carbon atoms and containing besides the single nitrogen atom only the elements carbon and hydrogen while having in the reaction mixture at least 1.5 mols of said amine per epoxide equivalent weight of said phenol-derived polyether.

2. A process for curing a glycidyl polyether of a dihydric phenol having a 1,2-epoxy equivalency between 1.0 and 2.0 to a resinous material which comprises heating said polyether in admixture with the preformed reaction product obtained by reacting a secondary amine with a glycidyl polyether of a dihydric phenol having a 1,2-epoxy equivalency between 1.0 and 2.0 while having present at least 1.5 mols of said amine per epoxide equivalent weight of said last-mentioned polyether, said secondary amine containing a single nitrogen atom which is linked directly to two different carbon atoms and containing besides the single nitrogen atom only the elements carbon and hydrogen, and said admixture containing said preformed reaction product in such a proportion with the polyether that the mixture contains about 0.1 to 4% nitrogen.

3. A process of curing a glycidyl polyether of 2,2-bis(4-hydroxyphenyl)propane having a 1,2-epoxy equivalency between 1.0 and 2.0 to a resinous material which comprises heating said polyether at about 50 to 250° C. in admixture with the preformed reaction product from reaction of a secondary amine of 2 to 10 carbon atoms with a glycidyl polyether of 2,2-bis(4-hydroxyphenyl)-propane having a 1,2-epoxy equivalency between 1.0 and 2.0 while employing from about 2 to 5 mols of said amine per epoxide equivalent weight of said last-mentioned polyether, said secondary amine containing a single nitrogen atom which is linked directly to two different carbon atoms and containing besides the single nitrogen atom only the elements carbon and hydrogen, and said admixture having the preformed reaction product present in such proportion with the polyether that the mixture contains about 0.2 to 3% of nitrogen.

4. A process of curing a glycidyl polyether of 2,2-bis(4-hydroxyphenyl)propane having a 1,2-epoxy equivalency between 1.0 and 2.0, and a molecular weight of about 320 to 624 to a resinous material which comprises heating said polyether at about 60 to 150° C. in admixture with the preformed reaction product from reaction of dimethylamine with a glycidyl polyether of 2,2-bis-(4-hydroxyphenyl)propane having a 1,2-epoxy equivalency between 1.0 and 2, and an epoxide equivalent weight of about 175 to 400 while employing about 2 to 5 mols of said amine per epoxide equivalent weight of said last-mentioned polyether, and said admixture having the preformed reaction product present in such proportion with the polyether that the mixture contains about 0.2 to 3% nitrogen.

5. A process of curing a glycidyl polyether of 2,2-bis(4-hydroxyphenyl) propane having a 1,2-epoxy equivalency between 1.0 and 2.0, and a molecular weight of about 320 to 624 to a resinous material which comprises heating said polyether at about 60 to 150° C. in admixture with the preformed reaction product from reaction of diethylamine with a glycidyl polyether of 2,2-bis-(4-hydroxyphenyl)propane having a 1,2-epoxy equivalency between 1.0 and 2, and an epoxide equivalent weight of about 175 to 400 while employing about 2 to 5 mols of said amine per epoxide equivalent weight of said last-mentioned polyether, and said admixture having the preformed reaction product present in such proportion with the polyether that the mixture contains about 0.2 to 3% nitrogen.

6. A process of curing a glycidyl polyether of 2,2-bis(4-hydroxyphenyl)propane having a 1,2-epoxy equivalency between 1.0 and 2.0, and a molecular weight of about 320 to 624 to a resinous material which comprises heating said polyether at about 60 to 150° C. in admixture with the preformed reaction product from reaction of piperidine with a glycidyl polyether of 2,2-bis(4-hydroxyphenyl)propane having a 1,2-epoxy equivalency between 1.0 and 2, and an epoxide equivalent weight of about 175 to 400 while employing at least 1.5 mols of said amine per epoxide equivalent weight of said last-mentioned polyether, and said admixture having the preformed reaction product present in such proportion with the polyether that the mixture contains about 0.2 to 3% nitrogen.

EDWARD C. SHOKAL.
HERBERT A. NEWEY.
THEODORE F. BRADLEY.

References Cited in the file of this patent

UNITED STATES PATENTS

| Number | Name | Date |
|---|---|---|
| 2,444,333 | Castan | June 29, 1948 |
| 2,528,932 | Wiles | Nov. 7, 1950 |
| 2,548,447 | Shokal | Apr. 10, 1951 |